April 6, 1926. 1,579,245
G. R. PENNINGTON
SPRING SUSPENSION FOR TRACK LAYING TRACTORS
Original Filed Nov. 13, 1919 2 Sheets-Sheet 1
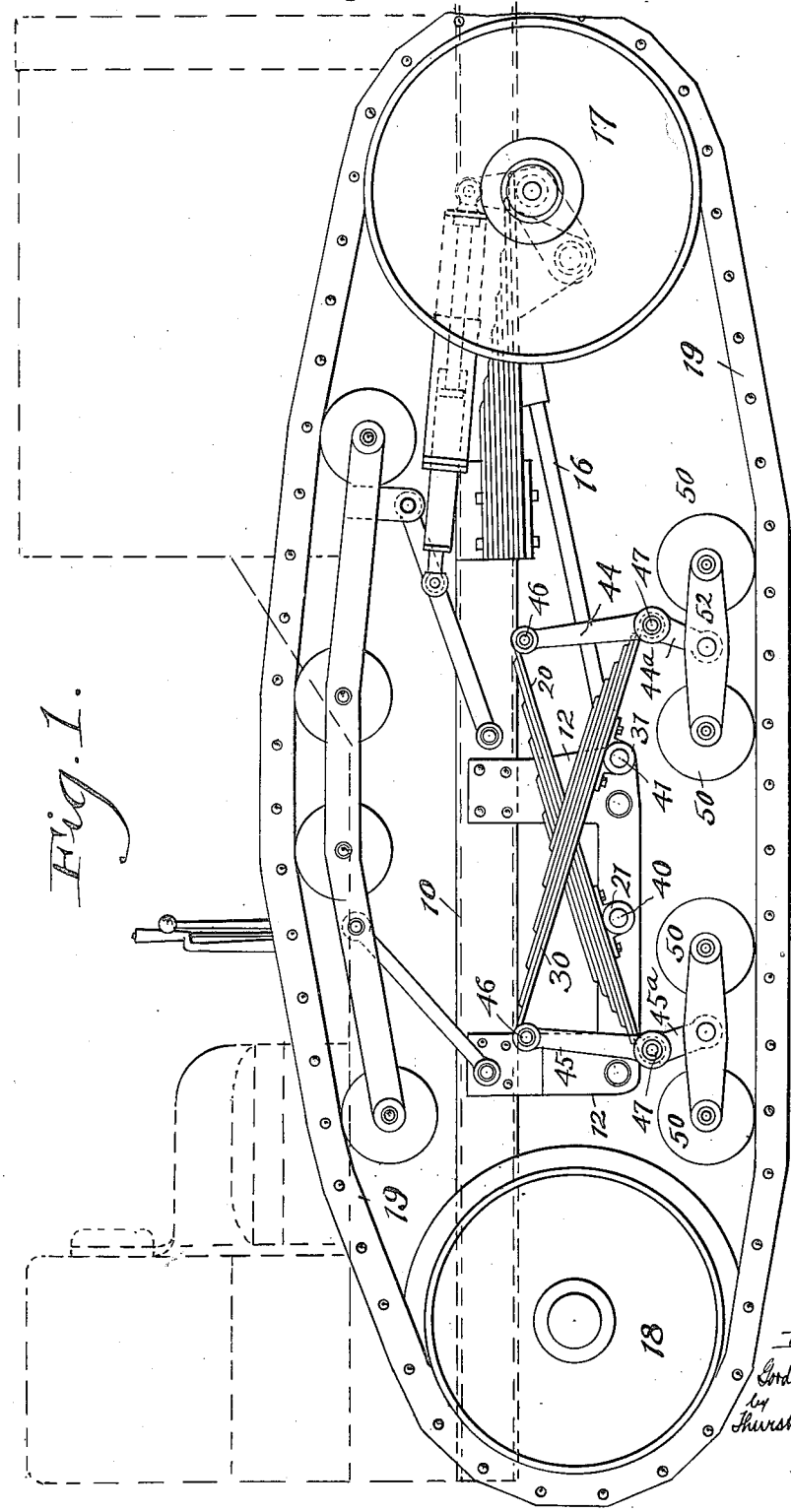

April 6, 1926.
G. R. PENNINGTON
1,579,245
SPRING SUSPENSION FOR TRACK LAYING TRACTORS
Original Filed Nov. 13, 1919   2 Sheets-Sheet 2
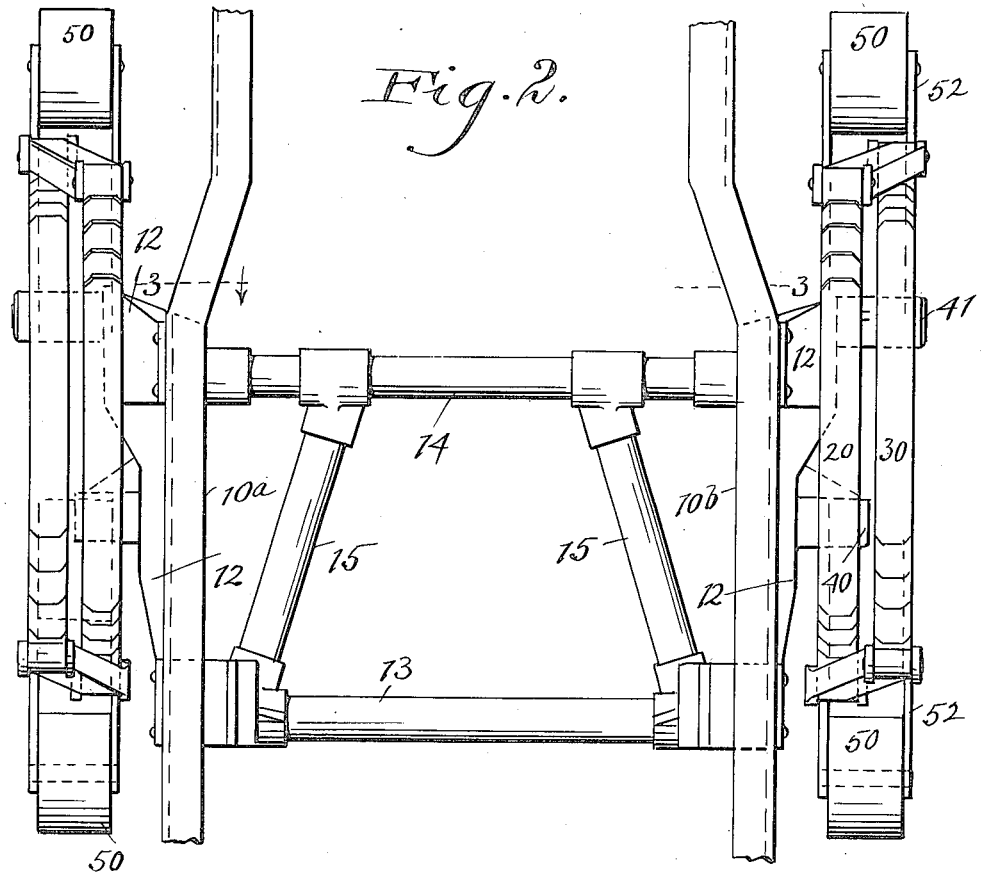
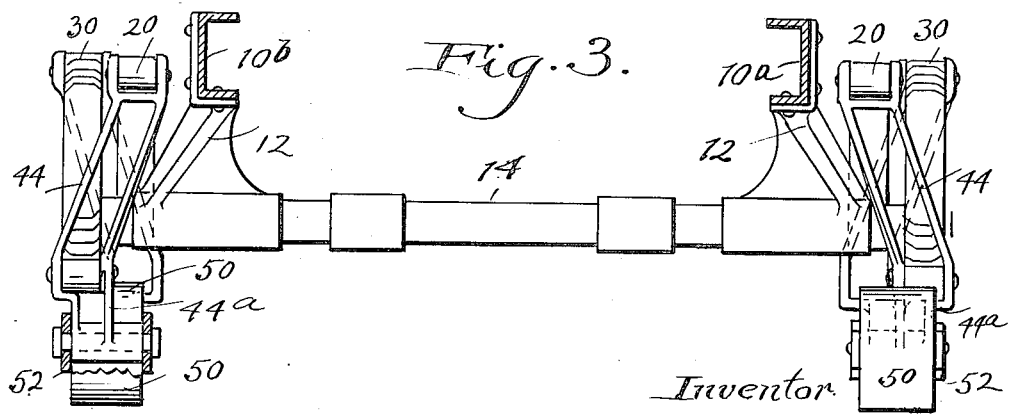

Patented Apr. 6, 1926.

1,579,245

UNITED STATES PATENT OFFICE.

GORDON R. PENNINGTON, OF CLEVELAND, OHIO.

SPRING SUSPENSION FOR TRACK-LAYING TRACTORS.

Application filed November 13, 1919, Serial No. 337,708. Renewed August 9, 1923.

*To all whom it may concern:*

Be it known that I, GORDON R. PENNINGTON, a citizen of the United States, residing at Cleveland, in the county of Cuyahoga and State of Ohio, have invented a certain new and useful Improvement in Spring Suspension for Track-Laying Tractors, of which the following is a full, clear, and exact description.

This invention relates to means by which the motor carrying main frame of a track laying tractor is resiliently supported by an endless track structure.

In all of the prior track laying tractors which have attained any substantial practical success, each endless track structure has included a track frame or truck on which the load supporting track wheels are mounted; and these track frames or trucks have had two, and sometimes more than two, load supporting connections with the main frame, one at least of said connections being resilient; and in all of said prior structures guiding means have been provided for preventing lateral deflection of the track frames or trucks while permitting them, or some part of them, to move up and down relatively to the main frame, when the tracks are laid unevenly on rough ground.

In the present invention two rockers, for which I prefer to use leaf springs, connected with the main frame, together with certain adjunctive parts, are made to serve the same purposes, and to produce substantially the same results which have heretofore required the track frames or trucks, the load supporting connections thereof with the main frame, and the guiding means.

The invention in its preferred form consists in the combination with the main frame of said two leaf springs in the manner and by and with the means shown in the drawing and hereinafter described as definitely pointed out in the appended claims. It will be understood, however, that wide variations of the construction shown can be made without departing from the invention as defined in the claims.

In the drawings, Fig. 1 is a side elevation of so much of a track laying tractor as is necessary for the disclosure of the present invention; Fig. 2 is a plan view of those parts shown in Fig. 1 which are involved in this invention, and Fig. 3 is a sectional rear elevation of the parts shown in Fig. 2.

The invention is shown in a tractor having two endless track structures, one located on each side of the main frame; but this requires little more than the mere duplication, on opposite sides of the machine, of the primary invention. It is therefore apparent that the primary invention is applicable to tractors having only one endless track structure located on one side of the main frame, regardless of the means employed for supporting the other side of the main frame.

The main frame 10 may be of any suitable construction.

On each side of this main frame, in that form of the invention shown, there is an endless link belt track 19 which runs over two wheels 17 and 18, of which the wheel 17 is preferably an idler and the wheel 18 a driving sprocket. Both the driving sprocket and the front idler 17 are rotatably supported upon the main frame.

Attached to each of the two side beams of the main frame is a bracket 12. These two brackets may be connected together as by transverse bars 13 and 14, which in turn are connected by braces 15, 15, so that the two brackets and the parts which they support may be assembled apart from the main frame, and attached to it, and removed from it, as a unit, when desired, though being in effect a part of the main frame when assembled.

Two leaf springs 30 and 20 are pivoted to and lie outside of the associated bracket 12, the pivotal connections between said springs and bracket being located one in advance of the other, and preferably in the same horizontal plane. The two springs lie in different vertical longitudinal planes, one inside of, that is, nearer the main frame than the other,—the two brackets 12 being shaped, substantially as shown, to bring about this result when the springs are pivoted to them by the pivot studs 40, 41, which are secured to and project outward from the bracket.

The pivot blocks 21, 31, are respectively secured to the two springs; and these pivot blocks are mounted to rock upon the studs 40, 41, but have no movement lengthwise of the studs. The two springs 20, 30, thus constitute in effect resilient rockers. It is desirable that the front ends of the two springs shall be in approximately the same vertical transverse plane; and it is likewise desirable that the rear ends of said springs shall be in approximately the same transverse vertical plane. It is therefore necessary, if the pivots of the springs are located as stated, that the pivot blocks 21, 31, be attached to the respective springs much nearer one end thereof than the other, wherefore each spring has a short resilient arm and a long resilient arm; the short resilient arm of the spring 20 extends rearwardly and downwardly from the pivotal support of the spring, while the long arm thereof extends upwardly and forwardly from said pivoted spring. The short arm of the spring 30 extends forwardly and downwardly, while the rear arm thereof extends upwardly and rearwardly, from the pivotal support of said spring. The inclination of the springs as stated is not essential to the invention, but is necessary in the preferred contruction in which the spring pivots are in substantially the same horizontal plane, one in advance of the other, and the ends of the springs are in the relative positions stated.

An approximately vertical bar 44 is pivotally connected to the front ends of the two springs 20—30, and extends downward below the lower spring end. This bar 44 is bifurcated, and each spring has at its end an eye which goes between the two sides of the bifurcated bar so that pivot pins 46, 47, which go respectively through the eyes of the two springs may produce the pivotal connection between said springs and these bars. A similar bar 45 is connected in like manner to the rear ends of the two springs, and extends below the bottom spring. Track engaging wheels 50 are mounted on these downward extensions 44ª, 45ª, of the two bars 44, 45.

In the specific construction shown, there are two pairs of wheels 50, the wheels of each pair being mounted at opposite ends of a wheel frame 52. The two wheel frames are respectively pivoted centrally to the downward extension of the two bars 44, or 45. Each wheel frame as shown consists of two side plates between which the wheels 50 and the associated bar 44 or 45 project.

From the foregoing description it is apparent that a very considerable freedom of vertical motion with respect to the main frame may be had by the track wheels 50 so that they may run on the portion of the track which is laid on the ground, however irregular may be the profile of that track due to irregularities of the ground surface on which it is laid.

The load of the motor carrying main frame is, in the construction shown and described, transmitted to the springs through the two studs 40, 41, which are spaced apart an appreciable distance longitudinally. This construction adequately resists the tendency of the main frame to pitch or rock on a horizontal transverse axis. Likewise the shocks or jars received by the track wheels as they travel along an unevenly laid track are largely absorbed by the springs through which these shocks must be transmitted before they can reach the main frame.

The construction shown likewise resists the lateral forces applied to the track wheels because those forces are transmitted from the track wheels to the wheel frames 52, thence to the vertical bars 44, 45, to the springs 30, 20, and thence through the pivot blocks and their supporting studs to the motor supporting main frame. The forces exerted by the vertical bars upon the ends of the spring will in each case be in a direction substantially parallel to the axis of the pivots 46, 47, so that no twisting forces are applied to the ends of these springs. It will be further noted that due to the relative lengths of the lever arms of the springs the greatest forces will be received on the ends of the short resilient arms of such springs, and that the lesser forces will be received by the long resilient arms of the springs. The forces acting on the springs due to the lateral forces on the track wheels are all in the direction in which they are best resisted by the springs due to the fact that in this direction the spring leaves have their greatest dimensions and modulus of section. Furthermore each spring, in addition to its direct pivotal connection with the main frame, has an indirect pivotal connection therewith through one of the bars 44, 45 and the other spring; and this two-point pivotal connection of each spring contributes, in the construction shown, to its lateral stability. It will be seen, therefore, that the combination as shown and described is very resilient in a vertical plane, and very stiff and resistant in any other planes. Therefore no means such as guides are needed to prevent lateral displacement of the wheels.

It will be observed when one of the bars 44 or 45 is elevated that the ends of the rockers 20 and 30 which are connected to the other of these bars tend to move relatively to each other and that this tendency to relative movement is compensated for in the specific construction shown by making the rockers 20 and 30 resilient. Obviously, this necessary resilience may be provided for in a variety of ways.

Having described my invention, I claim :—

1. In vehicle spring suspension, the combination with the main frame of two rockers which are pivotally connected respectively with the main frame at points located one in advance of the other, a device connecting the front ends of both rockers, another device connecting the rear ends of both rockers, and wheels rotatably mounted on said two devices one of said rockers or frames being a resilient member.

2. The combination with the main frame of two resilient rockers which are pivotally connected respectively with the main frame at points located one in advance of the other, a device connecting the front ends of said resilient rockers, another device connecting the rear ends of said resilient rockers, and wheels rotatably mounted on said two devices.

3. The combination with the vehicle frame of two leaf springs which are pivoted to the frame on parallel transverse pivots located one in advance of the other, the pivotal point on one spring being nearer the front than the rear end of said spring, and the pivotal point of the other spring being nearer the rear than the front end of said spring, a bar pivotally connected with the front ends of said two springs, a second bar pivotally connected with the rear ends of said two springs and wheels rotatably supported by the lower ends of said two bars.

4. The combination with the vehicle frame of two leaf springs which are pivoted to the frame on parallel transverse pivots located one in advance of the other, the pivotal point in one spring being nearer the front than the rear end thereof and the pivotal point of the other spring being nearer the rear than the front end thereof, each spring having an eye at each end thereof, a bifurcated bar which straddles the front eyes of both springs and is pivoted to said eyes, a bifurcated bar which straddles the rear eyes of both springs and is pivoted to said eyes, and wheels which are rotatably carried by downward extensions on said two bifurcated bars.

5. The combination with the vehicle frame of two leaf springs which are pivoted to the frame on parallel transverse pivots located one in advance of the other, the pivotal point in one spring being nearer the front than the rear thereof and the pivotal point of the other spring being nearer the rear than the front end thereof, each spring having an eye at each end thereof, a bifurcated bar which straddles the front eyes of both springs and is pivoted to said eyes, a bifurcated bar which straddles the rear eyes of both springs and is pivoted to said eyes, wheel frames pivoted between their ends to downward extensions of said two bifurcated bars respectively, and wheels which are rotatably mounted in the ends of said wheel frames.

6. In a track laying tractor, the combination with the main frame, having a downwardly extending rigid bracket, two oppositely inclined leaf springs which lie in different vertical longitudinal planes outside of said bracket, pivots located in the same horizontal plane substantially, one in advance of the other, connecting the two springs and the bracket, the pivotal connection between the bracket and one spring being nearer the front than the rear end of said spring, and the pivotal connection between the bracket and the other spring being nearer the rear than the front end of said spring, the front ends of said springs being in substantially the same vertical transverse plane and the rear ends of said springs being in substantially the same vertical transverse plane, a bar pivotally connected with the front ends of both springs, a bar pivotally connected to the rear ends of both springs, and track wheels rotatably supported upon downward extensions of said two bars.

7. In a track laying tractor, the combination with the main frame, having a downwardly extending rigid bracket, two oppositely inclined leaf springs which lie in different vertical longitudinal planes outside of said bracket, pivots located in the same horizontal plane substantially one in advance of the other connecting the two springs and the bracket, the pivotal connection between the bracket and one spring being nearer the front than the rear end of said spring and the pivotal connection between the bracket and the other spring being nearer the rear than the front end of said spring, the front ends of said springs being in substantially the same vertical transverse plane and the rear ends of said springs being in substantially the same vertical transverse plane, a bar pivotally connected with the front ends of both springs, a bar pivotally connected to the rear ends of both springs, a wheel frame centrally pivoted between its ends to the lower end of each of said bars, and track wheels mounted on said wheel frames at opposite sides of their pivots.

8. In a track laying tractor, the combination of a main frame, an endless track belt, two wheels which are rotatably supported on the main frame and over which said track belt runs, combined with two leaf springs which are pivotally connected with the main frame by pivots which are located one in advance of the other, a bar pivotally connected with the front ends of both springs, a second bar which is pivotally connected with the rear ends of both springs, and track engaging wheels mounted on the projecting lower ends of said two bars.

9. In a track laying tractor, the combination of a main frame, an endless track belt, two wheels which are rotatably supported on the main frame and over which said track belt runs, combined with two leaf springs which are pivotally connected with the main frame by pivots which are located one in advance of the other, a bar pivotally connected with the front ends of both springs, a second bar which is pivotally connected with the rear ends of both springs, a wheel frame pivotally connected with a downward extension of each of said bars and a pair of track wheels rotatably mounted upon each wheel frame on opposite sides of its pivotal connection with the associated bar.

10. In a track-laying tractor, the combination of a main frame, an endless belt track, and a spring suspension between the main frame and track comprising a leaf spring, means intermediate the ends of the spring forming a fixed pivotal connection thereof with the main frame, means forming between one end of the spring and the main frame a second pivotal connection movable to a limited extent in relation to said frame, and a track-engaging wheel carried by the spring, the connections between the spring, frame and wheel being adapted to permit a limited vertical movement of said wheel and hold it against lateral displacement.

11. In a track-laying tractor, the combination of a main frame, an endless belt track, and a spring suspension between the main frame and track comprising a rocker, means intermediate the ends of the rocker forming a fixed pivotal connection thereof with the main frame, means comprising a spring member forming between one end of the rocker and the main frame a second pivotal connection movable to a limited extent in relation to said frame, and a track-engaging wheel carried by the rocker, the connections between the rocker, frame and wheel being adapted to permit a limited vertical movement of the wheel and hold it against lateral displacement.

12. In a track-laying tractor, the combination of a main frame, an endless belt track, and a spring suspension between the main frame and track comprising a leaf spring, means intermediate the ends of the spring forming a fixed pivotal connection thereof with the main frame, means forming between one end of the spring and the main frame, a second pivotal connection movable to a limited extent in relation to said frame, a wheel frame pivotally connected to the other end of said spring, and a pair of track-engaging wheels mounted on the wheel frame, the connections between the spring, main frame and wheels being adapted to permit a limited vertical movement of the wheels and hold them against lateral displacement.

13. In a track-laying tractor, the combination of a main frame, an endless belt track, and a spring suspension between the main frame and track comprising a rocker, means intermediate the ends of the rocker forming a fixed pivotal connection thereof with the main frame, means comprising a spring member forming between one end of the rocker and the main frame a second pivotal connection movable to a limited extent in relation to said frame, a wheel frame pivotally connected to the other end of said rocker, and a pair of track-engaging wheels mounted on the wheel frame, the connections between the rocker, main frame and wheels being adapted to permit a limited vertical movement of the wheels and hold them against lateral displacement.

In testimony whereof, I hereunto affix my signature.

GORDON R. PENNINGTON.